United States Patent
Day et al.

(10) Patent No.: US 7,308,437 B2
(45) Date of Patent: Dec. 11, 2007

(54) OPTIMIZATION OF QUERIES USING RETRIEVAL STATUS OF RESOURCES USED THEREBY

(75) Inventors: Paul Reuben Day, Rochester, MN (US); Brian Robert Muras, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 436 days.

(21) Appl. No.: 10/691,296

(22) Filed: Oct. 22, 2003

(65) Prior Publication Data

US 2005/0091196 A1   Apr. 28, 2005

(51) Int. Cl.
   *G06F 17/30*   (2006.01)
(52) U.S. Cl. ............... 707/2; 707/3; 707/4; 707/5; 707/200
(58) Field of Classification Search ........... 707/1–10, 707/203; 709/203
   See application file for complete search history.

(56) References Cited

U.S. PATENT DOCUMENTS

| | | | | |
|---|---|---|---|---|
| 5,812,996 | A * | 9/1998 | Rubin et al. ............... | 707/2 |
| 5,822,749 | A * | 10/1998 | Agarwal .................... | 707/2 |
| 6,073,129 | A * | 6/2000 | Levine et al. .............. | 707/4 |
| 6,266,658 | B1 * | 7/2001 | Adya et al. ................ | 707/2 |
| 6,353,818 | B1 * | 3/2002 | Carino, Jr. ................ | 707/2 |
| 6,356,890 | B1 * | 3/2002 | Agrawal et al. ........... | 707/2 |
| 6,763,357 | B1 * | 7/2004 | Deshpande et al. ....... | 707/101 |
| 2001/0037329 | A1* | 11/2001 | Huffman et al. ........... | 707/3 |
| 2001/0051956 | A1* | 12/2001 | Bird ........................... | 707/203 |
| 2002/0107914 | A1* | 8/2002 | Charisius et al. .......... | 709/203 |
| 2003/0065648 | A1* | 4/2003 | Driesch et al. ............. | 707/2 |
| 2004/0073549 | A1* | 4/2004 | Turkel et al. .............. | 707/5 |
| 2004/0243555 | A1* | 12/2004 | Bolsius et al. ............. | 707/3 |

* cited by examiner

*Primary Examiner*—Khanh B. Pham
(74) *Attorney, Agent, or Firm*—Wood, Herron & Evans, LLP

(57) ABSTRACT

An apparatus, program product and method utilize the retrieval status of a resource to generate an access plan for a database query that uses the resource. The retrieval status, which indicates, for example, what percentage of a given resource is already stored in working memory, and thus need not be separately retrieved during query execution, may be used to generate more accurate input/output cost estimates for access plans, and thus enable a query optimizer to better select an access plan that is optimal under given runtime conditions.

20 Claims, 4 Drawing Sheets

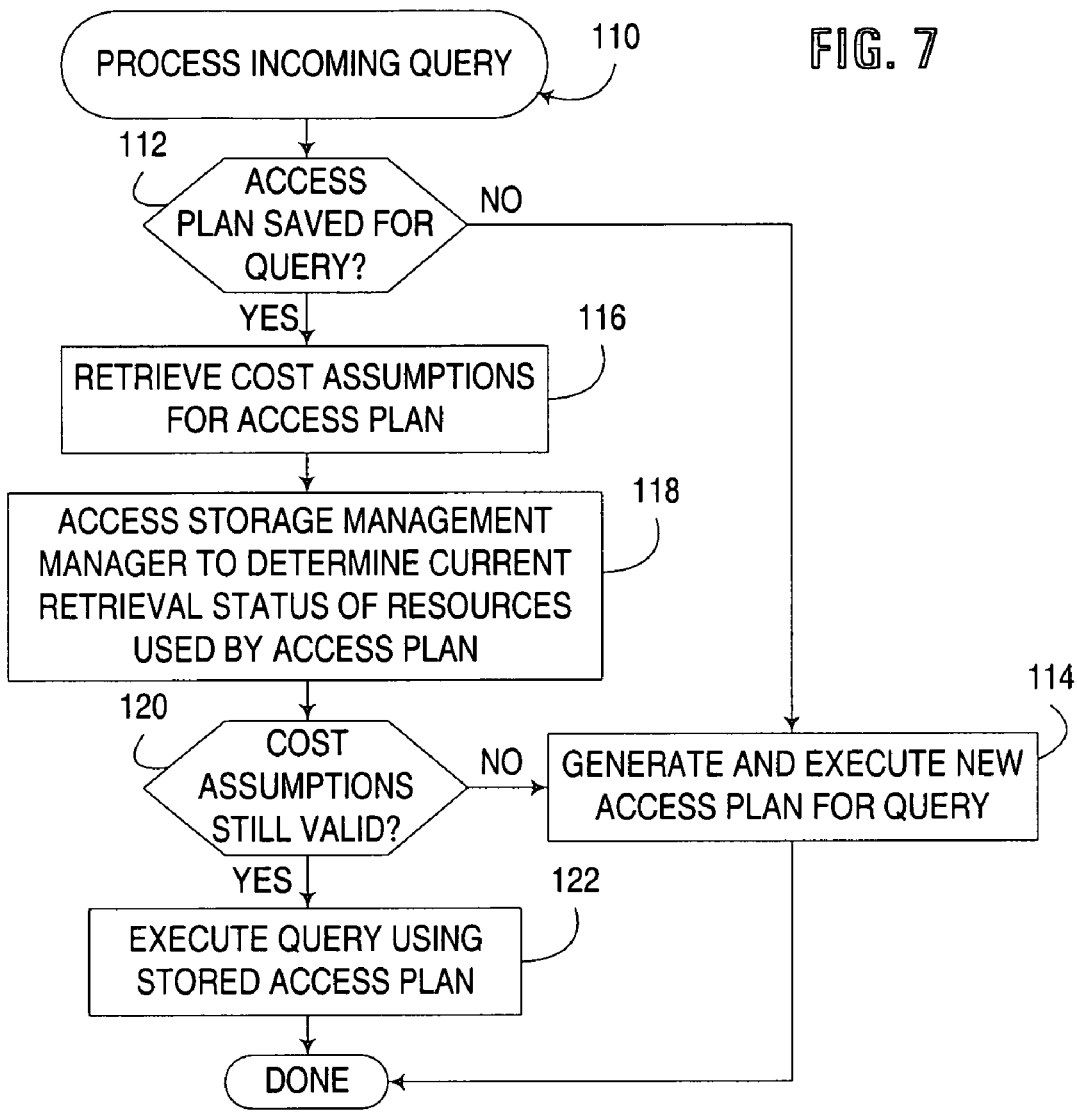

OPTIMIZATION OF QUERIES USING RETRIEVAL STATUS OF RESOURCES USED THEREBY

FIELD OF THE INVENTION

The invention relates to database management systems, and in particular, to the optimization of queries executed by database management systems.

BACKGROUND OF THE INVENTION

Databases are used to store information for an innumerable number of applications, including various commercial, industrial, technical, scientific and educational applications. As the reliance on information increases, both the volume of information stored in most databases, as well as the number of users wishing to access that information, likewise increases. Moreover, as the volume of information in a database, and the number of users wishing to access the database, increases, the amount of computing resources required to manage such a database increases as well.

Database management systems (DBMS's), which are the computer programs that are used to access the information stored in databases, therefore often require tremendous resources to handle the heavy workloads placed on such systems. As such, significant resources have been devoted to increasing the performance of database management systems with respect to processing searches, or queries, to databases.

Improvements to both computer hardware and software have improved the capacities of conventional database management systems. For example, in the hardware realm, increases in microprocessor performance, coupled with improved memory management systems, have improved the number of queries that a particular microprocessor can perform in a given unit of time. Furthermore, the use of multiple microprocessors and/or multiple networked computers has further increased the capacities of many database management systems. From a software standpoint, the use of relational databases, which organize information into formally-defined tables consisting of rows and columns, and which are typically accessed using a standardized language such as Structured Query Language (SQL), has substantially improved processing efficiency, as well as substantially simplified the creation, organization, and extension of information within a database.

Furthermore, significant development efforts have been directed toward query "optimization," whereby the execution of particular searches, or queries, is optimized in an automated manner to minimize the amount of resources required to execute each query. A query optimizer typically generates, for each submitted query, an access plan, which typically incorporates low-level information telling the database engine that ultimately handles a query precisely what steps to take (and in what order) to execute the query. In addition, the access plan may select from different access methods (e.g., table scans or index accesses), based upon the available resources in the system.

In generating an access plan, a query optimizer typically creates multiple potential access plans, and selects the best among those potential access plans based upon the "cost" of each plan. The cost of each plan represents the amount of resources expected to be utilized by the plan (typically expressed in the expected amount of time to execute), and as such, selecting the plan with the lowest cost typically results in the most efficient (and quickest) execution of a query.

The cost of an access plan is typically calculated as a function of both processor cost and the input/output cost. The former is reflective of the expected amount of processor time required to execute the query, while the latter is reflective of the expected amount of time required to retrieve resources needed during query execution, e.g., to retrieve required data from persistent storage such as a disk drive into working memory.

Resources that may need to be retrieved in connection with a query may include, for example, tables or files in a database, as well as hash tables, indices, and the like. Such resources are retrieved into working memory principally for performance reasons, as working memory is usually several orders of magnitude faster than persistent storage media such as disk drives and the like.

In calculating the input/output cost associated with retrieving required resources, however, conventional costing algorithms generally make an assumption that the required resources have not been previously retrieved into working memory. In practice, however, some required resources may have been retrieved into working memory as a result of prior system activity, e.g., the execution of other queries. In such situations, the practical input/output cost associated with retrieving the resources would be significantly less than the cost that would be expected if the resources had to be retrieved from disk in connection with executing the query.

As an example, a query optimizer may receive a query such as:

SELECT * from X, Y
WHERE X.col1=Y.col1 and X.col2=? and Y.col3=?

In generating an access plan for such a query, one of the decisions that a query optimizer typically must make is selecting a join order, i.e., whether Y is joined to X or X is joined to Y. It may be the case that if both X and Y and all their indices are not in working memory, then joining Y to X is the optimal join order. However, it may also be the case that, if Y is already in memory, but none of X is in memory (e.g., if a previous query recently performed a table scan of Y), the opposite join order may actually result in better performance, because the practical input/output cost associated with retrieving Y into memory would be negligible. However, given that conventional costing algorithms assume that no required resources have already been retrieved into memory for the purpose of calculating input/output costs, the former join order will always be selected over the latter. Thus, under certain runtime conditions, conventional costing algorithms may make assumptions that are not consistent with actual costs, resulting in the selection of suboptimal access plans under such conditions A need therefore exists in the art for an improved manner of calculating the costs of potential access plans, and thus selecting optimal access plans for executing database queries, to address disparities in the actual costs that may arise during runtime.

SUMMARY OF THE INVENTION

The invention addresses these and other problems associated with the prior art by providing an apparatus, program product and method that utilize the retrieval status of a resource in generating an access plan for a database query that uses the resource. Typically, the retrieval status of the resource may be used to generate more accurate input/output cost estimates for access plans, and thus enable a query optimizer to better select an access plan that is optimal under current runtime conditions.

For example, certain embodiments consistent with the invention may determine what percentage of a resource such as a database table, a file, an index, or a hash table needed for a particular database query is already stored in working memory. Based upon the determined percentage, the input/output costs associated with retrieving that resource may be more accurately calculated, resulting in a more accurate cost estimate for any access plan utilizing the resource.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIG. 7 is a flowchart illustrating the program flow of another implementation of a process incoming query routine executed by the query optimizer of FIG. 2.

DETAILED DESCRIPTION

The embodiments discussed hereinafter determine a retrieval status of one or more resources utilized during execution of a database query to generate an optimal access plan for executing the database query. A resource consistent with the invention may represent practically any data that may need to be retrieved in connection with the execution of a query, e.g., data from a database file, data from a database table, an index, a hash table, a temporary result set or file (e.g., a materialized view), etc.

Moreover, the retrieval status of a resource may be implemented in a number of manners consistent with the invention. For example, the retrieval status may be based upon whether a resource is currently stored in different levels of a memory architecture, e.g., a working memory, different levels of cache memory, local vs. remote memory (e.g., in a distributed memory architecture such as NUMA), local or remote persistent storage, etc.

Furthermore, the retrieval status may also be represented using a number of different metrics, e.g., whether or not the resource is retrieved into the relevant memory, what percentage of the resource is retrieved into the relevant memory, pointers to the current location of various pages of the resource, etc. Furthermore, the amount of a resource may be based upon an exact percentage, or a less exact estimate (e.g., a percentage of pages or cache lines that at least partially include data allocated to the resource). Alternatively, the retrieval status may indicate what the estimated retrieval time or input/output cost would be for the resource (or a portion thereof) based upon the memory within which the resource currently resides (or memories within which different portions of the resource current reside).

As will become more apparent below, the retrieval status of a resource may be determined, for example, by accessing a resource manager (e.g., a storage manager, a memory manager, a cache memory manager or any other software and/or hardware component responsible for retrieving data from a memory architecture), as such a component typically maintains status information about the resources being managed thereby. For example, where retrieval status is based upon the retrieval of data from persistent storage into a working memory of a computer, the retrieval status for a resource may be determined by querying a resource manager such as a storage manager as to the percentage of the pages of the memory space allocated to the resource that are currently resident in the working memory. It will be appreciated, however, that the functionality used to determine retrieval status may be separate from a resource manager in other embodiments consistent with the invention.

Figure 1:
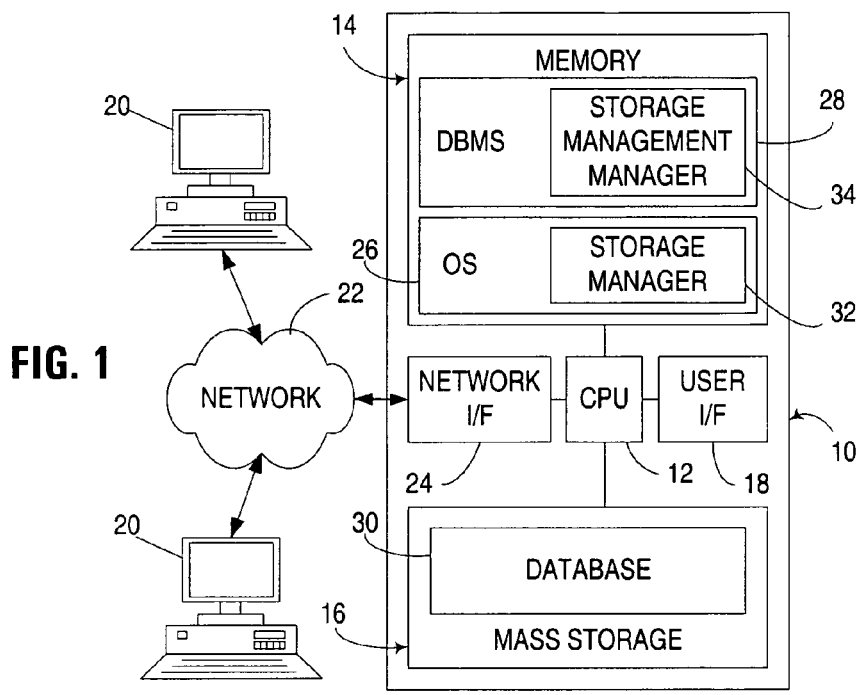
FIG. 1 is a block diagram of a networked computer system incorporating a database management system within which is implemented query optimization consistent with the invention.

Turning now to the Drawings, wherein like numbers denote like parts throughout the several views, FIG. 1 illustrates an exemplary hardware and software environment for an apparatus 10 suitable for implementing a database management system incorporating query optimization consistent with the invention. For the purposes of the invention, apparatus 10 may represent practically any type of computer, computer system or other programmable electronic device, including a client computer, a server computer, a portable computer, a handheld computer, an embedded controller, etc. Moreover, apparatus 10 may be implemented using one or more networked computers, e.g., in a cluster or other distributed computing system. Apparatus 10 will hereinafter also be referred to as a "computer," although it should be appreciated that the term "apparatus" may also include other suitable programmable electronic devices consistent with the invention.

Computer 10 typically includes a central processing unit (CPU) 12 including one or more microprocessors coupled to a memory 14, which may represent the random access memory (RAM) devices comprising the main storage of computer 10, as well as any supplemental levels of memory, e.g., cache memories, non-volatile or backup memories (e.g., programmable or flash memories), read-only memories, etc. In addition, memory 14 may be considered to include memory storage physically located elsewhere in computer 10, e.g., any cache memory in a processor in CPU 12, as well as any storage capacity used as a virtual memory, e.g., as stored on a mass storage device 16 or on another computer coupled to computer 10.

Computer 10 also typically receives a number of inputs and outputs for communicating information externally. For interface with a user or operator, computer 10 typically includes a user interface 18 incorporating one or more user input devices (e.g., a keyboard, a mouse, a trackball, a joystick, a touchpad, and/or a microphone, among others) and a display (e.g., a CRT monitor, an LCD display panel, and/or a speaker, among others). Otherwise, user input may be received via another computer or terminal, e.g., via a client or single-user computer 20 coupled to computer 10 over a network 22. This latter implementation may be desirable where computer 10 is implemented as a server or other form of multi-user computer. However, it should be appreciated that computer 10 may also be implemented as a standalone workstation, desktop, or other single-user computer in some embodiments.

For non-volatile storage, computer 10 typically includes one or more mass storage devices 16, e.g., a floppy or other removable disk drive, a hard disk drive, a direct access storage device (DASD), an optical drive (e.g., a CD drive, a DVD drive, etc.), and/or a tape drive, among others. Furthermore, computer 10 may also include an interface 24 with one or more networks 22 (e.g., a LAN, a WAN, a wireless network, and/or the Internet, among others) to permit the communication of information with other computers and electronic devices. It should be appreciated that computer 10 typically includes suitable analog and/or digital interfaces between CPU 12 and each of components 14, 16, 18, and 24 as is well known in the art.

Computer 10 operates under the control of an operating system 26, and executes or otherwise relies upon various computer software applications, components, programs, objects, modules, data structures, etc. For example, a database management system (DBMS) 28 may be resident in memory 14 to access a database 30 resident in mass storage 16. In addition, a storage manager 32 may be incorporated into operating system 26 to manage the retrieval of resources from mass storage into working memory, while a storage management manager 34 may be incorporated into DBMS 28 to interface with storage manager 32 to calculate the retrieval status of resources being managed by storage manager 32.

Moreover, various applications, components, programs, objects, modules, etc. may also execute on one or more processors in another computer coupled to computer 10 via a network, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable signal bearing media used to actually carry out the distribution. Examples of computer readable signal bearing media include but are not limited to recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

Figure 2:
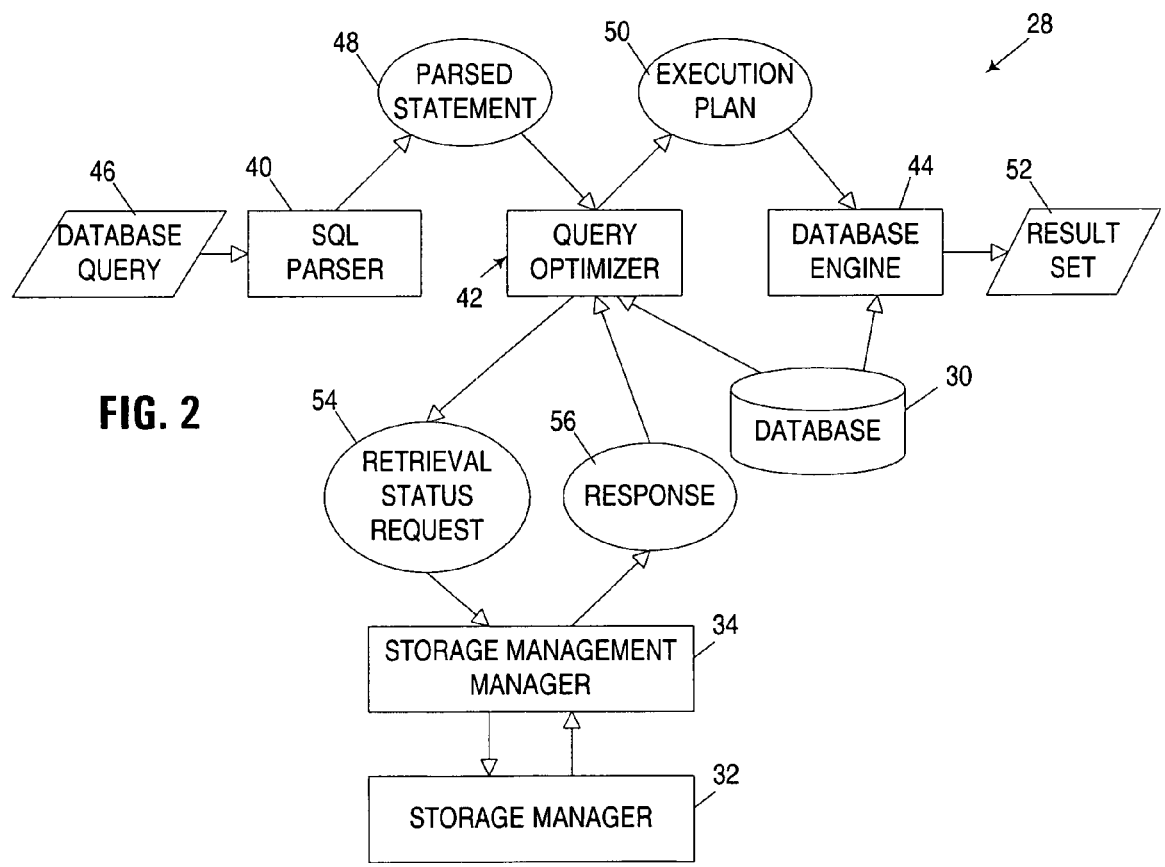
FIG. 2 is a block diagram illustrating the principal components and flow of information therebetween in the database management system of FIG. 1.

FIG. 2 next illustrates in greater detail the principal components in one implementation of DBMS 28. The principal components of DBMS 28 that are generally relevant to query execution are a Structured Query Language (SQL) parser 40, query optimizer 42 and database engine 44. SQL parser 40 receives from a user (or more typically, an application executed by that user) a database query 46, which in the illustrated embodiment, is provided in the form of an SQL statement. SQL parser 40 then generates a parsed statement 48 therefrom, which is passed to optimizer 42 for query optimization. As a result of query optimization, an execution or access plan 50 is generated. Once generated, the execution plan is forwarded to database engine 44 for execution of the database query on the information in database 30. The result of the execution of the database query is typically stored in a result set, as represented at block 52.

To assist in generating an optimal access plan, query optimizer 42 determines the retrieval status of one or more resources used by the query. In the illustrated embodiment, this determination incorporates the issuance of one or more retrieval status requests 54 from query optimizer 42, which are passed to storage management manager 34 to determine the retrieval status of the resource(s) at issue. As will be discussed in greater detail below, storage management manager 34 is configured to access storage manager 32 to determine the retrieval status of the resource and provide such information back to the query optimizer via a response 56.

Now turning to FIGS. 3-7, an exemplary implementation of the invention, within which query optimization is based in part on the determined retrieval status of one or more resources used during execution of a query, is illustrated in greater detail. Such an implementation may be utilized, for example, in an eServer iSeries computer from International Business Machines Corporation executing a DB2 database management system, along with a storage manager resident in an OS/400 operating system. The determination of the retrieval status of various resources is implemented within a storage management manager component in the DB2 database management system, which provides an interface to the query optimizer to retrieve an estimated percentage of a given resource that is currently in memory, and which calls the operating system storage manager to retrieve information needed to estimate that percentage, such as to retrieve the total size of the resource, and retrieve the amount of that resource that is currently in memory, either in number of bytes, number of pages, or as percentages.

In addition, the storage management manager may determine what level of memory the resource is in, such as working memory, cache memory, local versus remote, and pass this to the operating system storage manager. The storage management manager may also pass this level of memory information to the query optimizer so that, if needed, an appropriate adjustment can be made on the estimate based on the memory level. For example, if memory is remote, the query optimizer may use this information to bias the advantage of the percentage in working memory to be less of an advantage, since bringing in even a small portion of the remote memory would still be rather expensive compared to bringing in memory from a cache. It will be appreciated, however, that the query optimizer, storage management manager and storage manager may be allocated different functionality in other embodiments consistent with the invention. Moreover, a separate storage management manager may be omitted in some embodiments.

Figure 3:
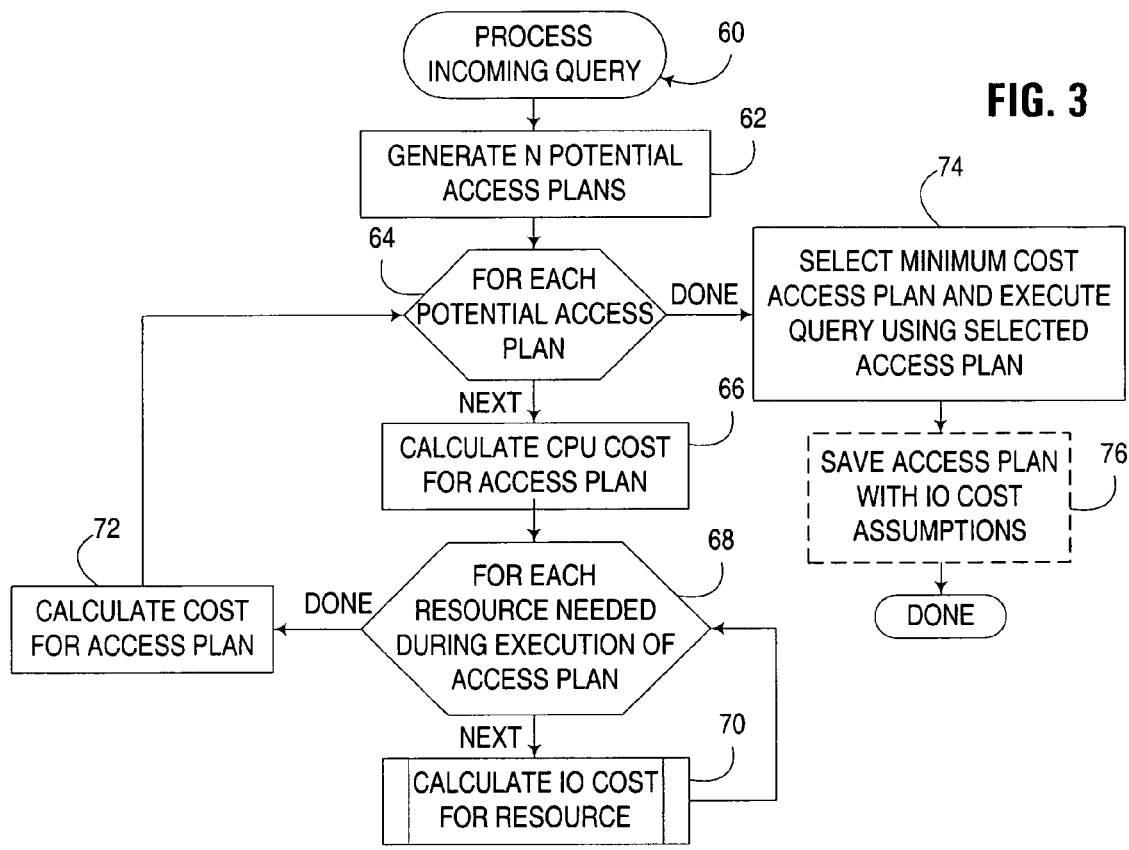
FIG. 3 is a flowchart illustrating the program flow of one implementation of a process incoming query routine executed by the query optimizer of FIG. 2.

FIG. 3 illustrates a process incoming query routine 60 executed by query optimizer 42 in response to reception of a parsed SQL statement. Routine 60 begins in block 62 by generating a plurality (N) of potential access plans, in any number of conventional manners known in the art. Each access plan represents a different way of executing the query.

Next, beginning in block 64, a costing algorithm is executed to calculate the estimated cost of each access plan. In particular, block 64 initiates a FOR loop to process each potential access plan. For each such plan, control passes to block 66 to calculate the processor (CPU) cost for the plan, using any number of conventional algorithms. Control then passes to block 68 to calculate the input/output (IO) costs for the resources used by the access plan. In particular, block 68 initiates a FOR loop to process each resource needed during execution of the access plan. For each such resource, a calculate IO cost for resource routine 70 is called to calculate the IO cost for the resource. Then, once the IO cost for each resource has been calculated, block 68 passes control to block 72 to calculate the total estimated cost for the access plan using the CPU cost calculated in block 68 and the IO costs for the various resources calculated in the loop implemented by blocks 68 and 70. Control then passes to block 64 to process additional access plans.

Once each potential access plan has been costed, block 64 passes control to block 74 to select the minimum cost access plan for implementing the query. The access plan is then passed to database engine 44 for execution in a conventional manner.

In addition, as illustrated in block 76, it may also be desirable in some implementations to save the access plan along with the IO cost assumptions under which the access plan was generated. As will be discussed in greater detail below in connection with FIG. 7, it may be desirable to save the cost assumptions along with the access plan when it is expected that the access plan may be reused (e.g., when the access plan is to be stored in a package or program for repeated usage). In other embodiments, e.g., where queries are generated dynamically and interactively, and are unlikely to be reused, block 76 may be omitted.

Figure 4:
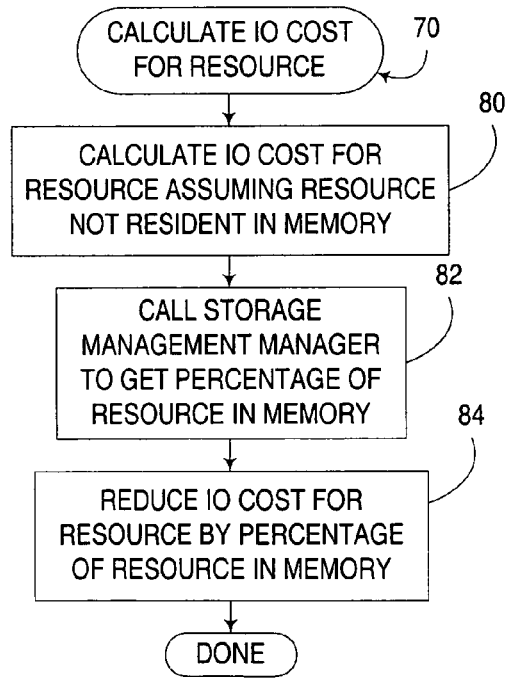
FIG. 4 is a flowchart illustrating the program flow of one implementation of the calculate IO cost for resource routine referenced in FIG. 3.

FIG. 4 next illustrates one implementation of calculate IO cost for resource routine 70. Routine 70 begins in block 80 by calculating the IO cost for the resource, assuming the resource is not resident in memory, e.g., using any of a number of conventional costing algorithms.

Next, block 82 calls a storage management manager resident in the database management system to obtain the estimated percentage of the resource that is currently in working memory. The call to the storage management manager may take the form, for example, of a request that specifies the identity of the resource. Moreover, as noted above, the percentage of the resource that is in memory may be represented in terms of percentage of bytes, or alternatively, in terms of percentage of cache lines, percentage of memory pages, etc.

As will be discussed below in greater detail in connection with FIG. 6, the storage management manager receives the request generated in block 82, calculates the estimated percentage and returns the calculated percentage in a response to the query optimizer. As such, block 82 also typically incorporates the reception of an appropriate response from the storage management manager.

Upon completion of block 82, control passes to block 84 to reduce the IO cost for the resource by the determined percentage of the resource that is resident in the working memory. Routine 70 is then complete.

Thus, as an example of the operation of routine 70, if it is determined that the IO cost for retrieving a certain table is five seconds, but that forty percent of the table is already in working memory, the IO cost may be reduced by forty percent, resulting in an IO cost of three seconds being used in the overall access plan cost determination.

It will be appreciated that other implementations of routine 70 may be used consistent with the invention. For example, rather than calculating an IO cost assuming the resource is not resident in memory, and then reducing that calculated cost based upon the retrieval status of the resource, routine 70 may simply calculate an IO cost from scratch based upon the percentage of the resource that is determined to be in the working memory. In addition, in other embodiments, a costing algorithm may determine the percentage of a resource that is in memory, applying one scaling factor reflective of the time required to access the data when resident in working memory to that percentage, and applying a second factor representative of the time required to access data when not resident in working memory to the remaining percentage. In the latter instance, the fact that some IO cost still is associated with accessing a resource in working memory may be accounted for (even though the cost is often orders of magnitude smaller than the cost of accessing a resource not already resident in working memory).

Yet another alternative that may be implemented in routine 70 is that of adjusting IO cost based upon the type of query. For example, if a query is designated as either a *FIRSTIO, or a FIRST N ROWS, meaning that the user is most interested in seeing early results for a few rows before returning all of the results, then an additional weight may be given to the percentage of the front end of a file, index or other resource that is already in memory. This is based on the fact that records will usually be referenced from the front of a resource first for these types of queries. While different weighting may be used in different embodiments, relatively simple weighting, such as if the first half of the resource is in memory, then weight this at an eighty percent multiplier, or if the first third of the resource is in memory, weight this at a fifty-five percent multiplier, etc., may be used.

Figure 5:
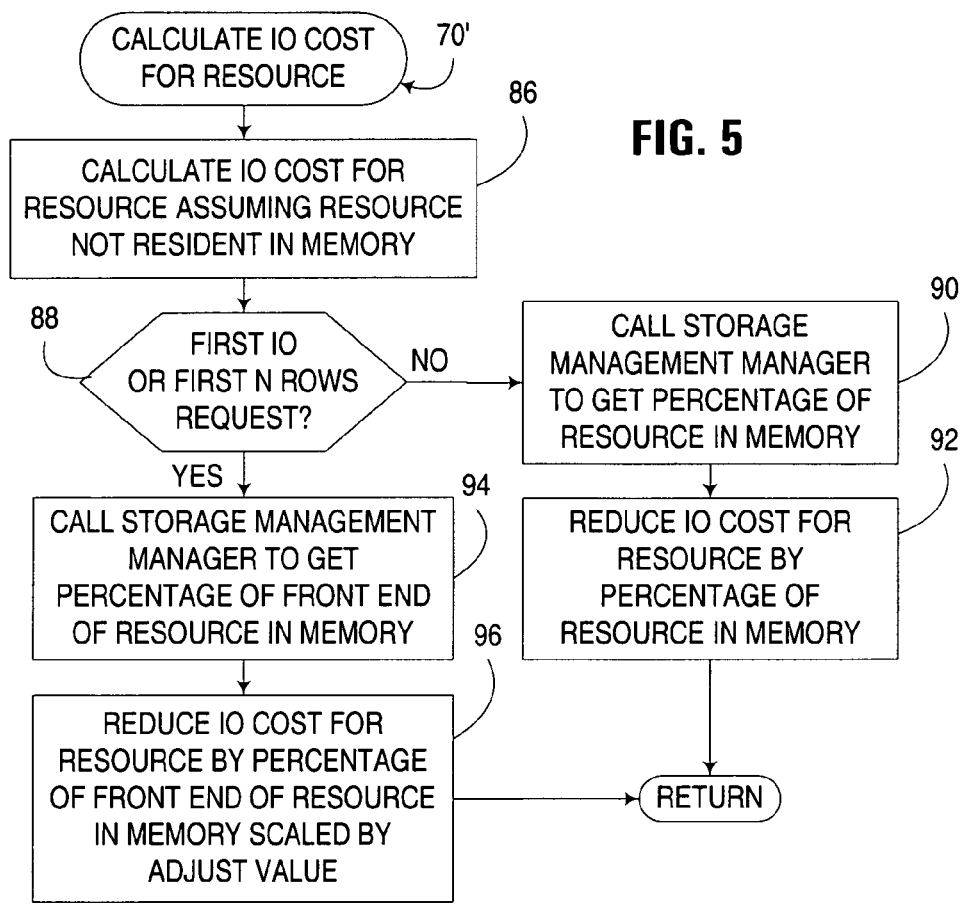
FIG. 5 is a flowchart illustrating the program flow of another implementation of the calculate IO cost for resource routine referenced in FIG. 3.

FIG. 5, for example, illustrates an alternate calculate IO cost for resource routine 70' that implements the aforementioned first end functionality. Routine 70' begins in block 86 by calculating the IO cost for a resource assuming that the resource is not resident in memory. Next, block 88 determines whether the request is a *FIRSTIO or FIRST N ROWS query.

If not, block 88 passes control to block 90 and 92 to call the storage management manager to obtain the percentage of the resource in memory and reduce the IO cost for the resource by that percentage, in a similar manner to routine 70 of FIG. 4.

If, on the other hand, an affirmative result is found in block 88, control passes to block 94 to call the storage management manager to obtain the percentage of the front end of the resource that is in memory. Control then passes to block 96 to reduce the IO cost for the resource by the percentage of the front end of the resource that is currently in working memory, and scaled by an adjust value. The adjust value may apply a multiplier to certain portions of a resource based upon the relative locations of such portions relative to the front end of the resource. In the alternative, the percentage of the resource may simply reflect the percentage of the front end of the resource, (e.g., the first half or third, or the first x pages) that is currently resident in working memory, with no separate scaling factor utilized.

Figure 6:
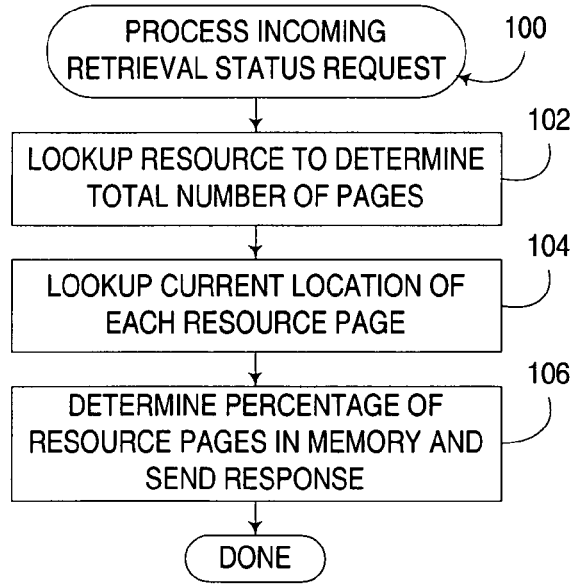
FIG. 6 is a flowchart illustrating the program flow of a process incoming retrieval status request routine executed by the storage management manager of FIG. 2.

FIG. 6 next illustrates a process incoming retrieval status request routine 100 that may be executed by a storage management manager in response to a retrieval status request issued by a query optimizer. Routine 100 begins in block 102 by looking up the resource to determine the total number of pages allocated to the resource. Next, block 104 looks up the current location of each resource page to determine whether that resource page is currently resident in working memory. Block 106 then determines the percentage of resource pages currently in working memory and returns an appropriate response to the query optimizer. Routine 100 is then complete.

In the illustrated embodiment, the storage management manager looks up the status of the resource by accessing the storage manager, e.g., via an interface provided by the storage manager. In the alternative, the determination of which pages are allocated to a resource, and the percentage of those pages that are currently resident in working memory, may be implemented within the storage manager itself. In such an instance, the storage management manager may be omitted, or in the alternative, may simply manage the passage of requests and responses from and to the query optimizer. In still other embodiments, the storage management manager may be capable of issuing a request to the storage manager for the percentage of an identified resource that is currently in working memory, with the response provided by the storage manager indicating such percentage.

In addition, where functionality is supported for separately weighting queries directed to the front end of a resource, functionality may be supported in a storage management manager and/or a storage manager to direct lookups to specific pages or portions of a resources, or to implement the scaling within the storage management manager or storage manager directly. In such instances, requests issued by the query optimizer may indicate that the request is related to the front end of the resource, and in some embodiments, to an identified portion of the resource. Other alternatives will be apparent to one of ordinary skill in the art having the benefit of the instant disclosure.

In addition, a storage manager consistent with the invention may be configured to dynamically generate retrieval status information in response to requests, or in the alternative, may separately maintain real time statistics on the percentages of resources that are currently resident in working memory so that the processing of requests only requires a lookup of prestored percentage data. For example, a storage management memory manager function may be implemented in a storage manager to dynamically track the percentage of each resource that is currently in working memory. In addition, a storage manager may store such information either in a separate database or storage area, or alternatively, may store the percentage along with its associated resource, e.g., stored in the header of each resource.

As noted above, it may also be desirable in some implementations to permit cost assumptions associated with a generated access plan to be stored along with the access plan and later utilized to determine whether to reuse an access plan during a subsequent execution of a query. For example, an alternate process incoming query routine 110 is illustrated in FIG. 7. Routine 110 begins in block 112 by determining whether an access plan is already saved for the query. If no such plan has been saved, control passes to block 114 to generate and execute a new access plan for the query, in generally the manner described above in connection with FIG. 3. Processing of the query is then complete.

On the other hand, if an access plan is saved for the query, block 112 passes control to block 116 to retrieve the cost assumptions associated with the stored access plan. Next, in block 118, the storage management manager is accessed to determine the current retrieval status of the resources used by the access plan, e.g., in the general manner described above in connection with blocks 68-70 of FIG. 3.

Next, block 120 determines whether the cost assumptions are still valid, i.e., whether the current retrieval status of the resources matches those under which the access plan was initially generated.

If the cost assumptions are not still valid, e.g., if the current retrieval status of one or more resources has changed greater than some threshold compared to the saved cost assumptions, block 120 passes control to block 114 to generate and execute a new access plan for the query, thereby bypassing the use of the saved access plan. If, on the other hand, the cost assumptions are still valid, block 120 passes control to block 122 to execute the query using the stored access plan. Routine 110 is then complete.

Therefore, it will be appreciated that, when the cost assumptions for a saved access plan are still valid, the overhead associated with generating a new access plan may be avoided.

Various additional modifications may be made to the illustrated embodiments without departing from the spirit and scope of the invention. Therefore, the invention lies in the claims hereinafter appended.

What is claimed is:

1. A method of optimizing a database query, the method comprising:
   determining a retrieval status for a resource used by the database query, wherein determining the retrieval status includes determining a percentage of the resource that is resident in a working memory;
   generating an access plan for the database query using the determined retrieval status for the resource, wherein generating the access plan includes:
      generating a plurality of alternate access plans:
      calculating a cost for each alternate access plan using the determined retrieval status for the resource; and
      selecting one of the alternate access plans based upon the calculated costs for each alternate access plan:
   storing the access plan, including associating with the stored access plan a retrieval status assumption for the stored access plan, the retrieval status assumption representing the determined retrieval status used to generate the access plan; and
   in response to a request to execute the stored access plan:

determining a current retrieval status for the resource, wherein determining the current retrieval status includes determining a percentage of the resource that is currently resident in the working memory;

comparing the current retrieval status with the retrieval status assumption: and selectively generating another access plan for the database query using the current retrieval status based upon the comparison of the current retrieval status with the retrieval status assumption.

2. The method of claim 1, wherein the resource is selected from the group consisting of a database file, a database table, an index, a temporary result set, a temporary file, a hash table, and combinations thereof.

3. The method of claim 1, wherein determining the retrieval status includes determining whether at least a portion of the resource is resident in working memory.

4. The method of claim 1, wherein determining the retrieval status includes determining whether at least a portion of the resource is resident in a cache memory.

5. The method of claim 1, wherein determining the retrieval status includes determining whether at least a portion of the resource is resident in a local or a remote memory.

6. The method of claim 1, wherein determining the retrieval status includes accessing a resource manager to obtain the retrieval status of the resource.

7. The method of claim 6, further comprising tracking, with the resource manager, the percentage of the resource that is in the working memory.

8. The method of claim 7, further comprising storing the percentage of the resource that is in working memory in a header for a persistent copy of the resource.

9. The method of claim 1, and wherein calculating the cost for each alternate access plan includes:

calculating the cost as a function of input/output cost and processing cost; and calculating the input/output cost by scaling an estimated input/output cost by a scalar value associated with the percentage of the resource that is resident in working memory.

10. The method of claim 1, wherein determining the retrieval status includes determining whether a beginning portion of the resource is resident in working memory, the method further comprising calculating a cost for the access plan based upon the determined retrieval status, including weighting the cost based upon the beginning portion of the resource being resident in working memory.

11. An apparatus, comprising:

at least one processor;

a memory that includes a working memory;

a resource manager; and program code resident in the memory and configured to be executed by the at least one processor to optimize a database query by determining a retrieval status for a resource used by the database query, and generating an access plan for the database query using the determined retrieval status for the resource, wherein the program code is configured to determine the retrieval status by accessing the resource manager to obtain the retrieval status of the resource, wherein the resource manager is configured to track a percentage of the resource that is in the working memory, and wherein the resource manager is further configured to store the percentage of the resource that is in working memory in a header of a persistent copy of the resource.

12. The apparatus of claim 11, wherein the resource is selected from the group consisting of a database file, a database table, an index, a temporary result set, a temporary file, a hash table, and combinations thereof.

13. The apparatus of claim 11, wherein the program code is configured to determine the retrieval status by determining whether at least a portion of the resource is resident in the working memory.

14. The apparatus of claim 11, wherein the memory further includes a cache memory, and wherein the program code is configured to determine the retrieval status by determining whether at least a portion of the resource is resident in the cache memory.

15. The apparatus of claim 11, wherein the working memory includes a local memory, wherein the memory further includes a remote memory, and wherein the program code is configured to determine the retrieval status by determining whether at least a portion of the resource is resident in the local or the remote memory.

16. The apparatus of claim 11, wherein the program code is configured to determine the retrieval status by determining a percentage of the resource that is resident in the working memory.

17. The apparatus of claim 11, wherein the program code is configured to generate the access plan by generating a plurality of alternate access plans, calculating a cost for each alternate access plan using the determined retrieval status for the resource, and selecting one of the alternate access plans based upon the calculated costs for each alternate access plan.

18. The apparatus of claim 17, wherein the retrieval status for the resource indicates a percentage of the resource that is resident in the working memory, and wherein the program code is configured to calculate the cost for each alternate access plan by calculating the cost as a function of input/output cost and processing cost, and calculating the input/output cost by scaling an estimated input/output cost by a scalar value associated with the percentage of the resource that is resident in the working memory.

19. The apparatus of claim 17, wherein the program code is further configured to store the access plan and associate with the stored access plan a retrieval status assumption for the stored access plan, wherein the retrieval status assumption represents the determined retrieval status used to generate the access plan, and wherein the program code is further configured to, in response to a request to execute the stored access plan, determine a current retrieval status for the resource, compare the current retrieval status with the retrieval status assumption, and selectively generate another access plan for the database query using the current retrieval status based upon the comparison of the current retrieval status with the retrieval status assumption.

20. The apparatus of claim 11, wherein the program code is configured to determine the retrieval status by determining whether a beginning portion of the resource is resident in the working memory, and wherein the program code is further configured to calculate a cost for the access plan based upon the determined retrieval status, and weight the cost based upon the beginning portion of the resource being resident in the working memory.

* * * * *